(12) United States Patent
Machado Dos Santos et al.

(10) Patent No.: US 7,638,102 B2
(45) Date of Patent: Dec. 29, 2009

(54) FLUID FLOW INVERSION CHAMBER FOR FEED SPRAY NOZZLES IN FCC UNIT RISERS

(75) Inventors: Claudio Fonseca Machado Dos Santos, Rio de Janeiro (BR); Nelson Patricio Junior, Rio de Janeiro (BR); Paulo Sergio Freire, Rio de Janeiro (BR); Sergio Roberto Barreiros Neves, Rio de Janeiro (BR)

(73) Assignee: Petroleo Brasileiro S.A. - Petrobras, Rio de Janeiro (BR)

( * ) Notice: Subject to any disclaimer, the term of this patent is extended or adjusted under 35 U.S.C. 154(b) by 395 days.

(21) Appl. No.: 11/604,830

(22) Filed: Nov. 28, 2006

(65) Prior Publication Data

US 2007/0148056 A1 Jun. 28, 2007

(30) Foreign Application Priority Data

Dec. 28, 2005 (BR) .................................... 0505654

(51) Int. Cl.
*B01J 8/18* (2006.01)
(52) U.S. Cl. ..................... 422/139; 422/140; 422/145

(58) Field of Classification Search ................ 422/139, 422/140, 145; 239/398, 590, 597
See application file for complete search history.

(56) References Cited

U.S. PATENT DOCUMENTS

| 3,071,540 | A |   | 1/1963  | McMahon et al. |           |
|-----------|---|---|---------|----------------|-----------|
| 4,434,049 | A |   | 2/1984  | Dean et al.    |           |
| 4,479,870 | A |   | 10/1984 | Hammershaimb et al. |      |
| 5,037,616 | A | * | 8/1991  | Williatte et al. | 422/140 |
| 5,562,818 | A |   | 10/1996 | Hedrick        |           |
| 6,645,437 | B1 | * | 11/2003 | Gauthier et al. | 422/139 |
| 6,936,227 | B1 | * | 8/2005  | De Souza et al. | 422/140 |
| 7,172,733 | B2 | * | 2/2007  | Gauthier et al. | 422/145 |

* cited by examiner

*Primary Examiner*—N. Bhat
(74) *Attorney, Agent, or Firm*—Nixon & Vanderhye, PC

(57) ABSTRACT

A fluid flow inversion chamber comprises a spray nozzle (3) which has a coaxial configuration of feed flow (12) and steam flow (11) streams capable of providing increased contact of the two streams within the reaction zone, and, as a consequence of the inversion of the coaxial configuration of feed flow (12) and steam flow (11) streams, avoids the formation of coke, which facilitates inspection and replacement of nozzles worn by erosion.

8 Claims, 5 Drawing Sheets

PRIOR ART

FLUID FLOW INVERSION CHAMBER FOR FEED SPRAY NOZZLES IN FCC UNIT RISERS

CROSS REFERENCE TO RELATED APPLICATION

This application is based upon, claims the benefit of, priority of, and incorporates by reference, the contents of Brazilian Patent Application No. PI 0505654-3 filed Dec. 28, 2005.

BACKGROUND OF THE INVENTION

This invention deals with a fluid flow inversion chamber to be applied on feed spray nozzles, specifically, spray nozzles located in the hydrocarbon feed tubes of risers found in Fluid Catalytic Cracking (FCC) units.

Fluid catalytic cracking processing (known as FCC) encompasses the conversion of high molecular weight hydrocarbons to obtain light fractions of higher commercial value. The FCC processes basically cause the high molecular weight hydrocarbons to come into contact with a particulate or finely divided catalyst, at high temperature, that will behave like a fluid when mixed with gas or steam within a reaction zone.

FCC process cracking reactions to obtain light hydrocarbons are conveniently performed on risers in the presence of catalysts or in transfer pipes in which the catalyst is moved from one duct to another together with the hydrocarbon steam flow. A mixture formed by the catalyst and the hydrocarbon goes from one riser or line transfer reactor to a separation zone, in which the hydrocarbon steams are separated from the catalyst using cyclones. The particles of the catalyst that fall from the cyclones are then moved to a second separation zone, normally a fluid-bed in dense phase in which the remaining hydrocarbon steams are removed from the catalyst using water steam, in other words, the catalyst is rectified with water vapor. Afterwards, the separated catalyst is directed to a regeneration zone where the residual coke impregnated with catalyst (a byproduct of the riser reactions) is removed by oxidation through air, and finally, the catalyst is led back to the riser or line transfer reactor, completing the cycle.

In this instance, various precepts of the state of the art are known, such as:

U.S. Pat. No. 4,434,049 describes a device for injecting fine droplets of hydrocarbons into a flow of fluidized catalyst in which the hydrocarbon is initially discharged through an opening in an impact surface located inside a mixing pipe.

The mixing pipe distributes a cross steam flow that simultaneously enters into contact with the liquid. The combined flow of oil and steam exits the pipe through an opening, which transforms the feed into a spray of fine droplets and directs the spray to a particulate catalyst flow.

U.S. Pat. No. 3,071,540 describes an injector apparatus for a catalytic cracking unit in which a stream of gas traveling at high velocity, water steam for example, converge peripherally into a rising stream of hydrocarbon; the mix formed is then discharged through openings in which the impact between the steam and the hydrocarbon and the subsequent discharge through openings facilitates the formation of fine droplets of liquid hydrocarbon, in such a way that a spray of droplets enters into contact with a stream of catalyst particles in a coaxial flow.

The injection devices discussed in the aforementioned documents depend upon relatively high fluid velocities and pressure drop along the pipeline so that hydrocarbon atomization occurs. Such characteristics are only achieved by project modifications and increasing equipment costs, by exchanging incompatible equipment for equipment having the required operational pressure levels, such as pumps and heat exchangers that are normally used to feed gas and liquid into the injection device.

Another useful characteristic in the dispersal of the hydrocarbon stream in FCC processes includes the use of gas for elevation to preaccelerate the catalyst particles before entering in contact with the stream. The catalyst particles first enter into the riser at a speed of zero in the final flow direction of the catalyst in the interior of same. The beginning, or the change in the direction of the particle flow, creates turbulent conditions in the bottom of the riser. When the feed is introduced into the bottom of the riser, the turbulence causes a poor distribution and variations in the contact time between the catalyst and the feed.

In order to obtain a more uniform dispersion, the catalyst particles enter initially into contact with an elevating gas to start an upward movement. The elevating gas creates a pre-acceleration zone that moves the catalyst along the riser before coming into contact with the feed. Afterwards, the catalyst is elevated by the riser and is contacted with a hydrocarbon stream through radial feed injection in a conical section of same. This avoids the turbulence and secondary particulate mixtures that might occur when the contact phase takes place in the bottom of the riser. The documentation of U.S. Pat. No. 4,479,870 may be cited as a good example of the method discussed above.

Another important characteristic of the FCC processing technique includes atomization of hydrocarbon feeds. Elevating gas and radial feed injection is used to uniformly disperse a stream of hydrocarbons along a transverse section of a reaction zone in a riser. When a hydrocarbon stream enters into contact with a hot catalyst, cracking and volumetric expansion of hydrocarbons causes an increase in the volumetric rate of the fluids that go through the inside of the riser. A great part of the referenced volumetric increase occurs immediately upstream from the feed injection point.

With regard to this feature, U.S. Pat. No. 5,562,818 describes a method for volumetric control that occurs simultaneously with the mixture of the catalyst and the hydrocarbon, in order to prevent improper distribution which may adversely affect the quantity and quality of the products obtained. This can be obtained promoting the elimination of the turbulent secondary mixture, as well as the removal of the acquiescent zones in the section of riser immediately upstream from the point of the feed injection.

As shown above, in most devices, injection is located in the pipe in the lower part of the riser, which starts the rise of particles or injects the feed when particles begin to rise by means of one another fluid used for this purpose. As the complexity of distribution devices increases, undesirable interruptions to the process become more common as well as the inevitable reflux of the catalyst mixed with the feed on the inside of the spray nozzles. This event causes significant interference in the operation of the spray nozzles, therefore there will be a greater accumulation of the catalyst particles mixed with oil (hydrocarbons), forming a cokeable paste in the small openings, spaces, and orifices common in the devices used in fluidized stream bed particulate processes. The accumulation of catalyst particles and oil will end up clogging the nozzles, primarily due to the formation of coke which will force unit production to be periodically interrupted to clean the spray nozzles.

The quantity of spray nozzles depends on the production capacity of the unit and may be, for example, up to 8, 12, or more spray nozzles. Generally, the campaign time frame (the interval between major maintenance interventions) on FCC units is every four years in operation. The problems caused by clogging in some of these nozzles jeopardize the distribution of flows inside the riser, and, this is directly reflected in the efficiency of the process by causing undesirable interruptions outside the planned maintenance periods.

Currently, attempts to reduce or solve the clogging problem to increase the reliability of the utility and auxiliary systems and to improve interruption procedures for feed processing are either very laborious, expensive, or lengthy. Consequently, planned interruptions to the process, within the campaign periods, are generally avoided and/or delayed, which contributes to a loss of efficiency in the spray device due to partial obstruction of these from coke and/or catalyst and, subsequently, a fall in conversion, yield, and profitability of the unit.

The proposition presented in Brazilian Patent document PI 9905840-5 contributes with a significant improvement to solve the problem. It describes a spray system capable of fully atomizing a hydrocarbon stream, in which a geometric array allows energy to be used from a fluid atomizer (generally water vapor—steam), in order to atomize the hydrocarbon stream as well, thus improving the performance of the process and of the cracking unit.

A second improvement, described in the Brazilian patent document PI 0400497-3, includes the use of a riser feed spray nozzle in fluid catalytic cracking units with a modified sealed profile, to facilitate dismounting/removal of the spray nozzle and to reduce the FCC unit maintenance down times.

The above mentioned patent documents present significant contributions in the optimization of down times for maintenance and procedures for dismounting and removal of the nozzles.

In spite of this, there has been a growing preoccupation with minimizing maintenance times, improving procedures and ensuring that the process of operation using feed spraying devices is at maximum efficiency. In the meantime, minimization of the causes of clogging, and, consequently, of down times, has not yet been addressed.

The objective of this patent application is to solve this sealing problem, avoiding contact/accumulation of hydrocarbons or catalyst in the space between the spray nozzle and the pipe upon which it is mounted (lance), avoiding in this way, the formation of coke in the area and consequently, facilitating removal of the lance for future unclogging or replacement of the spray nozzle.

SUMMARY OF THE INVENTION

This invention deals with a fluid flow inversion chamber within a feed spray nozzle, preferably of the type described in patent number PI 0400497-3, to be used in risers employed in hydrocarbon Fluid Catalytic Cracking (FCCU) units. The spray nozzle mentioned has a coaxial configuration for feed flow and steam capable of avoiding the formation of coke on the external surface of the seal of the spray nozzle, which is made to come into contact with steam, and, in time, facilitates its easy removal for inspection and replacement of nozzles that are worn by erosion.

Also provided in this invention, sealing devices that fit on the injector nozzle that facilitate dismantling, as well as minimizing problems caused by particle accumulation.

These and other advantages become evident from the detailed description of the invention.

DETAILED DESCRIPTION OF THE INVENTION

Figure 1:
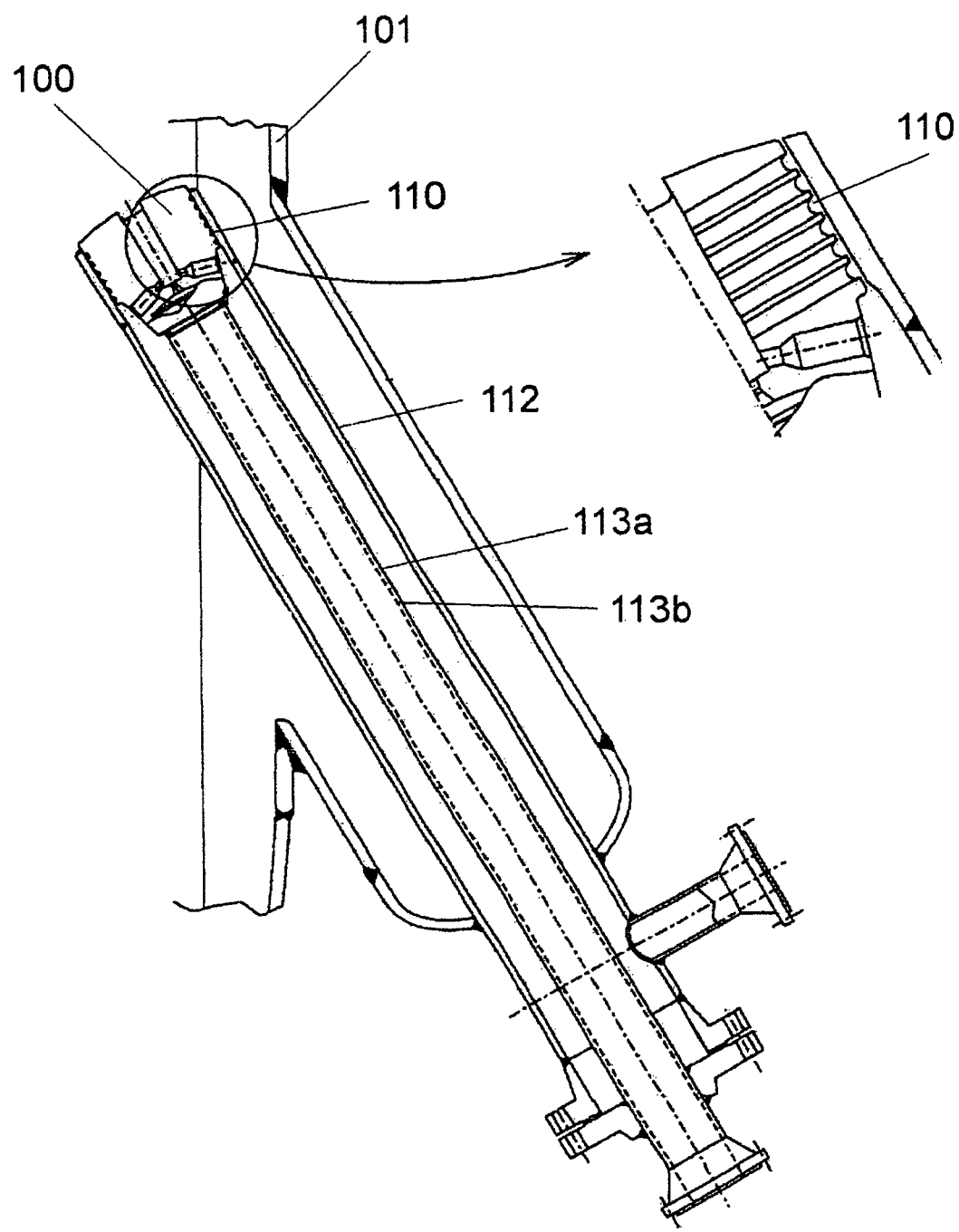
FIG. 1 shows a feed sprayer used in the state of the art.

The state of the art sprayers are shown in FIG. 1. Feed sprayers are usually made up of a spray nozzle (100), that atomizes the hydrocarbon stream, mounted on the end of a pipe (113a), forming a tube-nozzle assembly, which is called a lance (113b). Steam passes through the inside of the lance (113b) which is the fluid feed atomizer. The lance (113b) is mounted on the inside of a second pipe, called a jacket (112).

The hydrocarbon stream is driven through the annular space between the lance (113b) and the jacket (112) to laterally enter into the spray nozzle (100) to then be atomized upon coming into contact with the axial steam flow. In some cases, the jacket (112) acts as the nozzle that introduces the feed into the risers (101). At the end of the jacket (112), where the spray nozzle (100) operates, a sealing device (110) is necessary to force the feed to enter laterally into the nozzle to be sprayed, instead of exiting directly between the nozzle and the jacket to the inside of the riser without producing the necessary spray.

The seal between the nozzle and the jacket constitutes one of the greatest deficiencies in state of the art sprayers.

As was discussed earlier, the contact with the catalyst is a critical point for the fluid catalytic cracking process. Therefore, it is very desirable to achieve a high efficiency in this stage, since this enhancement will have repercussions in later stages. When dealing with the FCC process in risers, the contact time must be short, therefore, the parameter to be optimized is an indication of the efficiency of the contact between the catalyst and the feed. The state of the art sprayers, such as that shown in FIG. 1, provide good performance in terms of spraying the feed and promoting good catalytic contact. However, they are not able to maintain this performance throughout the entire operational process period due to the propensity toward clogging and locking up of the section where the seal is located between the nozzle and the jacket.

An alternative for solving the problem is isolating the seal area with a second jacket to protect the entire lance (113b). However, this idea presents the disadvantage of reducing the available area for contact between the catalyst stream and the feed droplets, creating congestion in this area of the riser, worsening the catalytic contact and interfering negatively with the performance of the process.

The objective of the present invention is to invert the flow of the steam currents and of the feed, in order avoid the formation of coke in the seal area between the spray nozzle and its mounting pipe, facilitating the removal of the lances for future replacements.

This form of mounting the lances is capable of reducing the down time of up to one week to only 1 day, making it possible to take advantage of temporary down time of the unit to also replace spray nozzles that have eroded or that are clogged. With this, it will be possible to ensure that efficiency of the spray nozzle is maintained throughout the process operational period, forcing a more efficient contact between the hydrocarbon stream and the catalyst and, permitting better use of the particulate catalyst spray. As a result, it will permit, over time, better conversion, generating a significantly smaller number of undesirable secondary reactions during the cracking reaction.

Figure 2A:
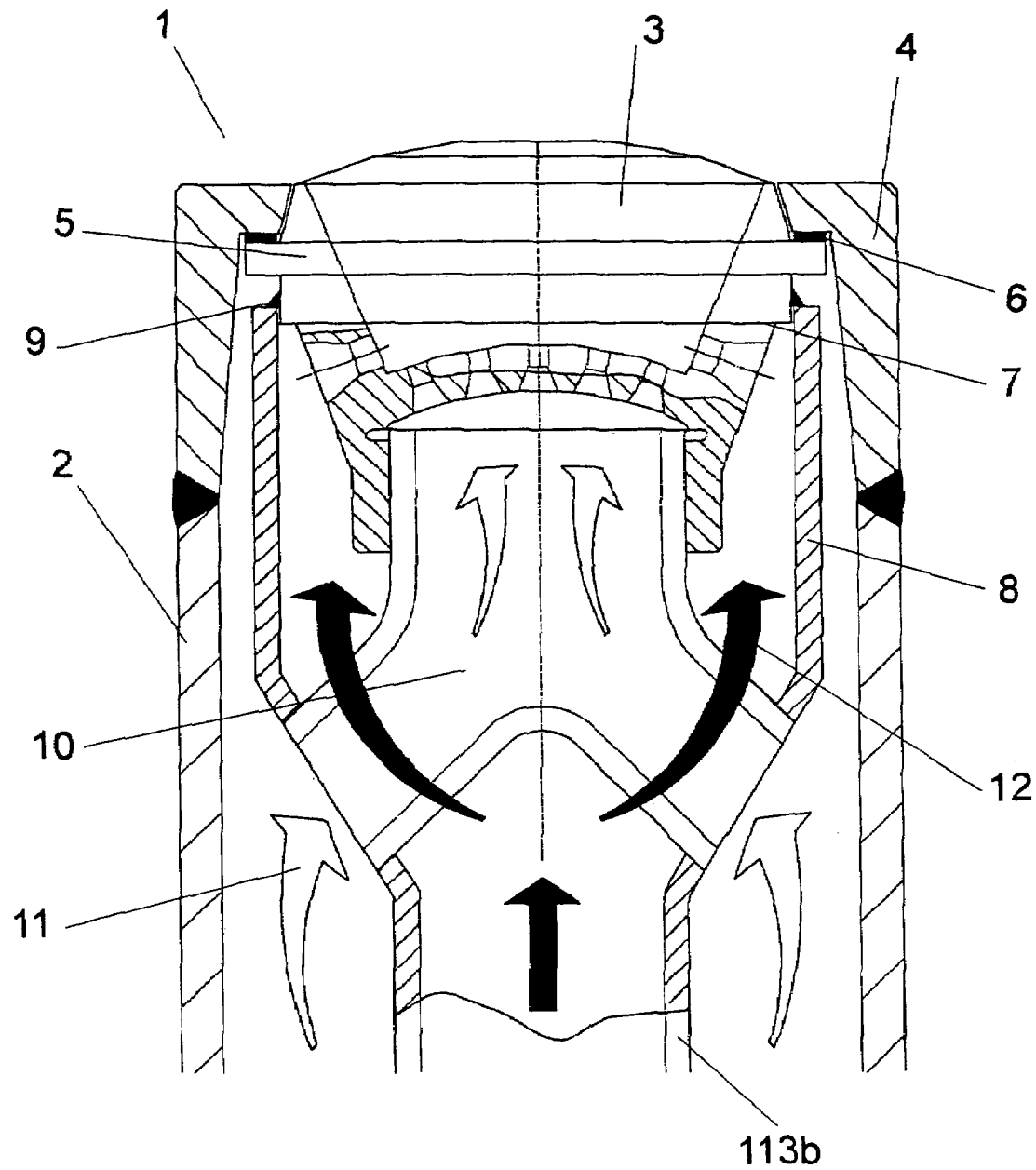
FIG. 2A shows a fluid flow inversion chamber of a spray nozzle which is the object of this invention.

As illustrated in FIG. 2A, the fluid flow inversion chamber (1) of this invention, includes an external housing (2) of which the upper portion is adapted as a spray nozzle (3) limited by L shaped edges (4) of the external housing (2) and the spray nozzle (3) flange (5). The L shaped edges (4) and the flange (5) define an interface into which a Cam profile gasket joint is provided (6). Below the flange (5) of the spray nozzle (3) a contact area (7) is located in which the spray nozzle attaches to an internal housing (8), which includes a pipe with an end shaped like a cup, that screws on, and will further down include a seal (9), such as a weld for example.

The spray nozzle (3) is connected to a small pipe shaped like an inverted Y (10), so that the contact area (7) of the spray nozzle is entirely limited by the Y, the ends of which cross through the walls of the internal housing (8), and communicate with the annular space formed between the internal housing (8) and external housing (2) through which the steam flow (11) pass. Said connection establishes a sealed condition in the steam flow pipe in relation to the lower part of the spray nozzle.

The fluid flow inversion chamber (1) includes, in a general manner, a point of convergence of two streams: a feed stream (12) and a steam flow (11) in which the feed stream (12) flows in an internal coaxial position, while the steam flow (11) flows in an external coaxial position. At the point in which these streams (11, 12) converge, an inverse flow condition is defined, after which the feed stream (12) begins to flow in an external coaxial position whereas the steam flow (11) begins to flow in an internal coaxial direction.

Figure 2B:
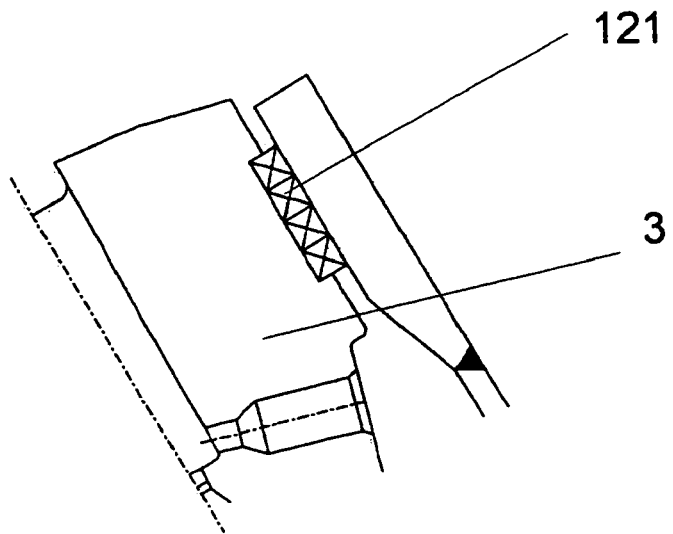
FIGS. 2B to 2D show different sealing alternatives for the spray nozzle of this invention.
Figure 2C:
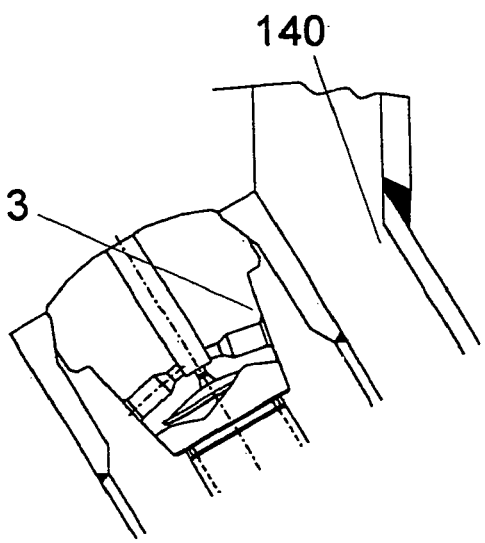
Figure 2D:
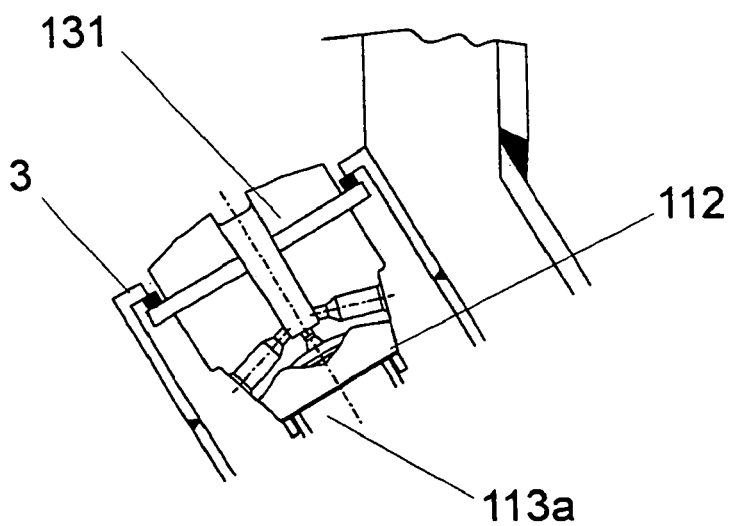
Figure 3A:
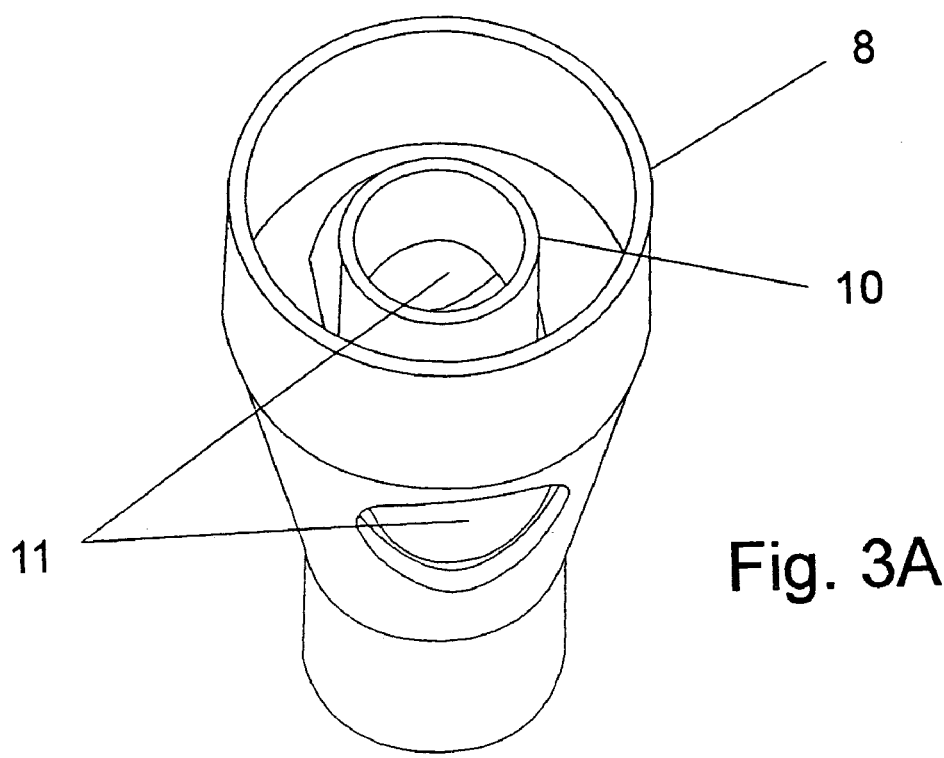
FIGS. 3A to 3D show cross-section details of the fluid flow inversion chamber from FIG. 2A in perspective.
Figure 3B:
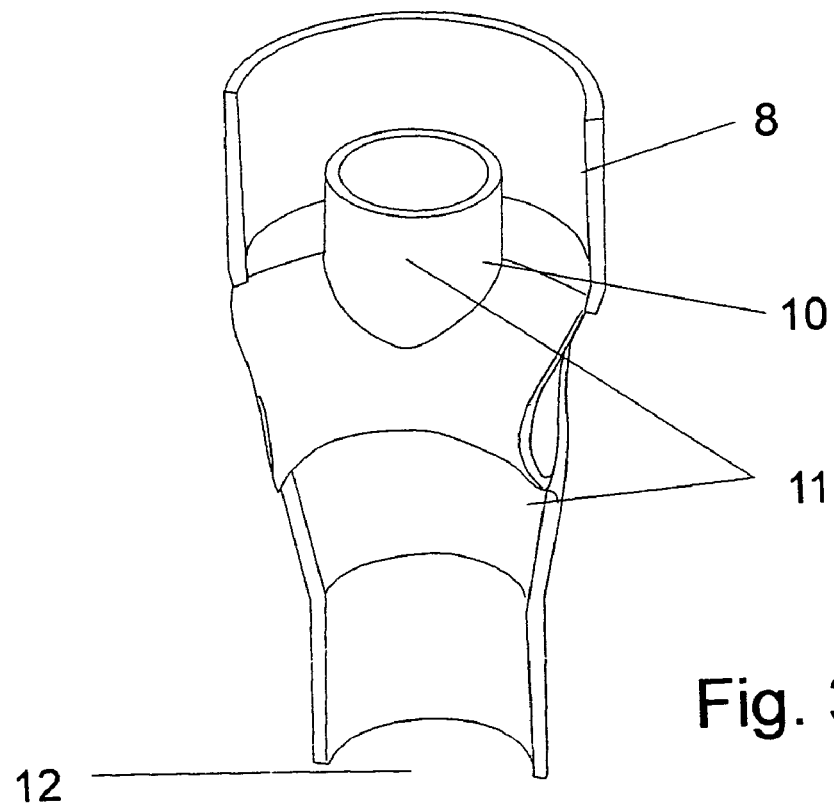
Figure 3C:
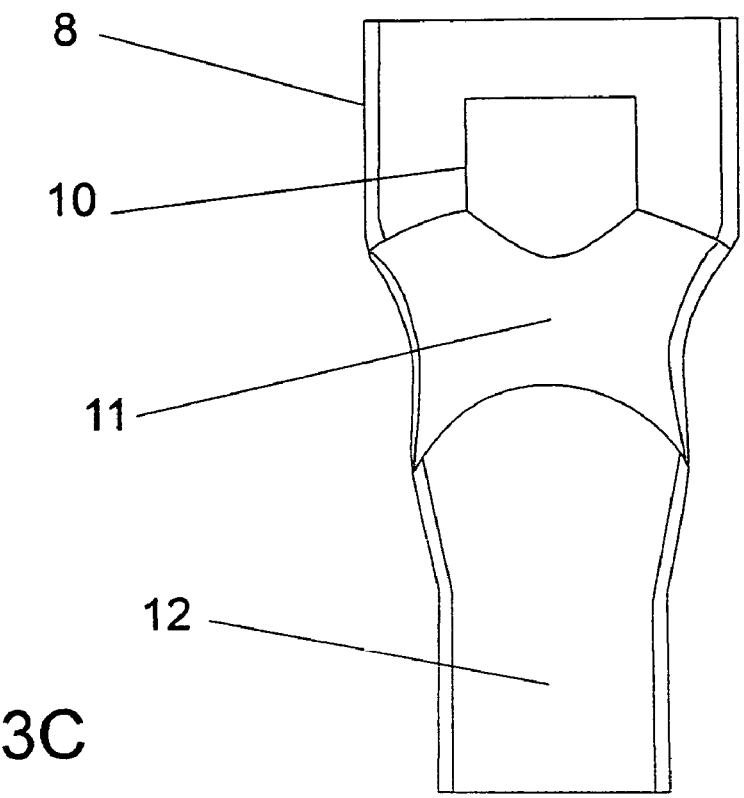
Figure 3D:
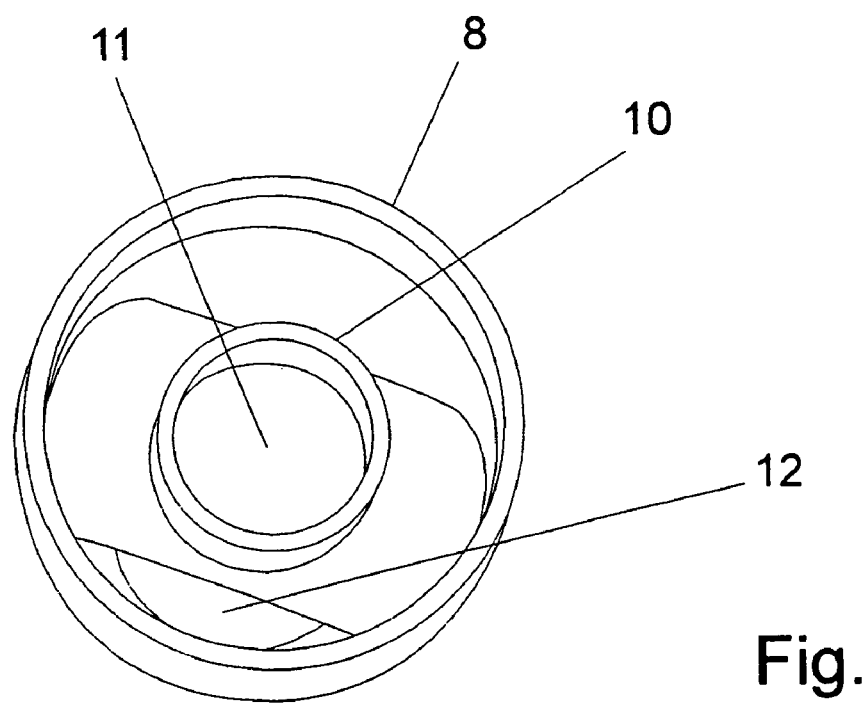

In accordance with the FIGS. 2B to 2D, different alternatives are shown for sealing the spray nozzle, where the mechanical device of this invention (which includes the fluid flow inversion chamber (1)), is mounted inside the jacket (112), making the inversion possible (without mixing), of the fluid streams that arrive at the feed sprayer. In this way, there will only be steam in the annular space between the jacket (112) and the lance (113b), suppressing the tendency to form coke in this area.

In the arrangement traditionally employed, there is a tendency to form coke due to the hydrocarbons flowing to the annular space, for the following reasons: from the feed itself, due to nature of the feed, or to the severity of the operational conditions, or even due to emergency conditions. Coke formed in this way can cause the nozzle to be impaired.

Sealing the spray nozzle (3) with the jacket (112) may be accomplished through the use of gaskets (121), sealing joint (131), or even by means of conical sealing surfaces (140), to prevent hydrocarbons and catalyst proceeding from the inside of the riser from entering into the annular space, thus eliminating another source of coke formation in this area.

The lower part of the chamber is welded to the lance pipe (113a), and the upper part of same, is threaded internally to the spray nozzle (3) and is welded all the way around its external perimeter.

The inversion of the coaxial flow of the feed (12) and vapor (11) streams ensures, throughout the entire process operation period, greater surface contact, which provides efficiency to the optimized conversion.

Furthermore, with greater efficiency throughout the entire process operation period, the secondary products of conversion will be substantially decreased and therefore will produce less particulate accumulation on the inside of the sprayer equipment, formed by the spray nozzle (3) and the fluid flow inversion chamber (1). However, even if these by-products are formed, the facility for removal and replacement of the spray nozzle (3), through short interruptions in the process, serves as an incentive to use fresh devices, assuring high efficiency throughout the running time of the process.

The fluid flow inversion chamber (1) now proposed provides great ease of replacement that, in association with a high efficiency spray nozzle (3), (although with an elevated risk of wear and blockage), allows cracking conversion efficiency to be maintained throughout the operational period of the FCC process.

Another aspect to be considered is that the seals provided at the points of the joints, such as those presented above, confine the particles that cause the accumulation, facilitating cleaning points and reducing down times for maintenance.

The existence of steam only in the annular space between the jacket (112) and the lance (113b) is another mechanism to facilitate maintenance procedures, which, in combination with the sealing devices, make down time, dismantling, and maintenance procedures less complex and more agile, implying greater conversion efficiency throughout the operational period in the FCC process.

The invention claimed is:

1. Feed sprayer for FCC unit riser comprising:
a spray nozzle having a peripheral flange and a contact area for connections defined below the flange;
an external housing having an axial end opening at an upper end portion thereof with an L-shaped peripheral edge adapted to receive said spray nozzle with the L-shaped peripheral edge in opposed facing relation to the peripheral flange of the spray nozzle;
a seal defined at the interface between said peripheral flange of the spray nozzle and said L-shaped peripheral edge of the external housing to provide a seal therebetween;
an internal housing to invert a first media flow from an internal coaxial flow position to an external coaxial flow position, the internal housing including a tube with a cup-shaped end connected to the contact area of the spray nozzle;
a seal defined at the connection between the internal housing and the contact area of the spray nozzle to prevent passage of flowing media through said connection; and
an inverted Y-shaped pipe disposed in the internal housing to invert a second media flow from an external coaxial position to an internal coaxial position, said Y-shaped pipe having an exit flow end being connected to the spray nozzle and having diverging in-flow ends communicating through the walls of the internal housing with an annular space formed between the internal and external housings.

2. A feed sprayer in accordance with claim 1, wherein the seal defined at the interface between the spray nozzle and the external housing comprises a plurality of gaskets.

3. A feed sprayer in accordance with claim 1, wherein the seal between the spray nozzle and the external housing comprises a sealing joint.

4. A feed sprayer in accordance with claim 1, wherein the seal between the spray nozzle and the external housing comprises opposed conical sealing faces of the peripheral flange and external housing.

5. A feed sprayer in accordance with claim 1, wherein the inverted Y-shaped pipe is connected to the spray nozzle by means of a threaded connection.

6. A feed sprayer in accordance with claim 1, wherein the contact area of the spray nozzle is confined by the inverted Y arranged pipe.

7. A feed sprayer in accordance with claim 1, wherein the seal is defined at the connection between the internal housing and the contact area by welding the internal housing to the contact area.

8. A feed sprayer in accordance with claim 1, wherein the first media flow is a feed stream and the second media flow is a steam flow.

* * * * *